United States Patent [19]
Liou

[11] Patent Number: 6,098,434
[45] Date of Patent: Aug. 8, 2000

[54] LOCK WITH CONVERTIBLE STRUCTURE

[76] Inventor: Gaieter Liou, No. 5 Tong Hwa Street, San Min District, Kaohsiung, Taiwan

[21] Appl. No.: 09/064,882

[22] Filed: Apr. 23, 1998

[51] Int. Cl.[7] .................................................. E05B 27/00
[52] U.S. Cl. .......................... 70/360; 70/361; 70/DIG. 20
[58] Field of Search .............................. 70/360, 361, 367, 70/DIG. 20, 201, 181

[56] References Cited

U.S. PATENT DOCUMENTS

| | | | |
|---|---|---|---|
| 1,406,289 | 2/1922 | Schaefer | 70/360 |
| 1,907,625 | 5/1933 | Vogt | 70/DIG. 20 X |
| 1,951,418 | 3/1934 | Jacobi | 70/360 |
| 2,032,821 | 3/1936 | Waits | 70/360 |
| 2,098,189 | 11/1937 | Kistner | 70/360 |
| 4,009,599 | 3/1977 | Patriquin | 70/360 X |
| 4,099,395 | 7/1978 | Garza | 70/360 |
| 4,196,605 | 4/1980 | Garza | 70/360 |
| 4,809,525 | 3/1989 | Cox | 70/360 X |
| 5,134,764 | 8/1992 | Taylor | 70/360 X |
| 5,447,049 | 9/1995 | Shieh | 70/360 |
| 5,596,894 | 1/1997 | Lee | 70/181 X |
| 5,765,413 | 6/1998 | Jung | 70/360 X |

FOREIGN PATENT DOCUMENTS

| | | | |
|---|---|---|---|
| 1167217 | 4/1964 | Germany | 70/361 |
| 1195200 | 6/1965 | Germany | 70/361 |
| 404586 | 1/1934 | United Kingdom | 70/360 |

OTHER PUBLICATIONS

Taiwan Laid–Open Utility patent No. 292627, published on Dec. 1, 1996.

*Primary Examiner*—Suzanne Dino Barrett
*Attorney, Agent, or Firm*—Watson Cole Grindle Watson, P.L.L.C.

[57] ABSTRACT

A convertible lock structure includes a main body including a lock core received therein and a latch rod extending from an end thereof. The main body includes a transverse hole defined therein for receiving an end of a spring-biased control latch. A casing receives the main body and includes an end wall through which the latch rod extends. The casing further includes at least two positioning holes one of which is selected to receive the second end of the control latch. A second end of the control latch is operable by a proper key so as to move between a retracted position inside the main body which allows the main body to move in the casing and an extended position beyond the transverse hole to retain the main body in position.

9 Claims, 6 Drawing Sheets

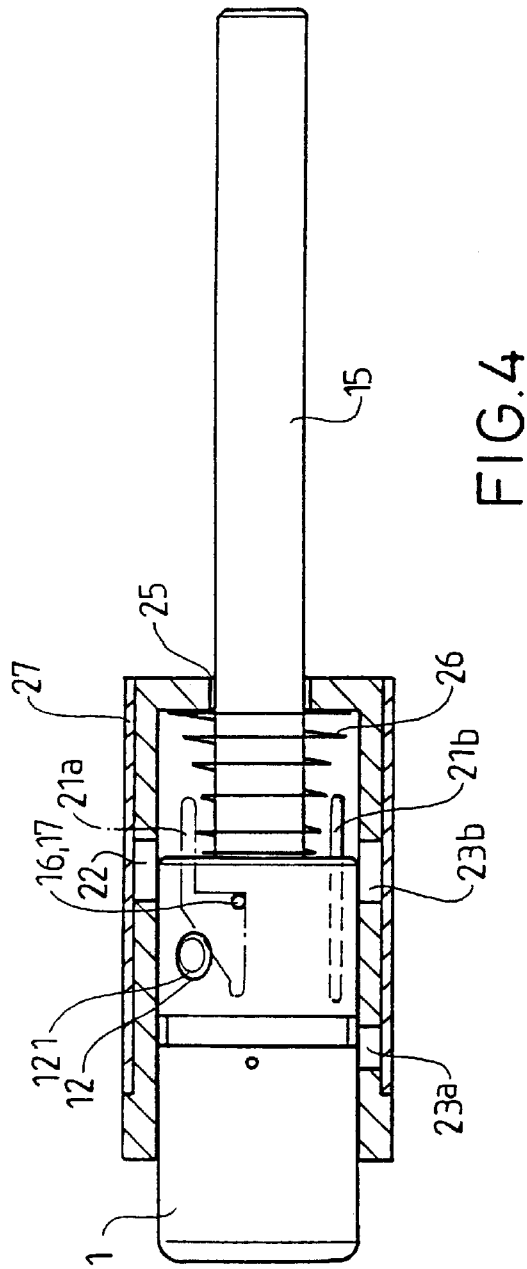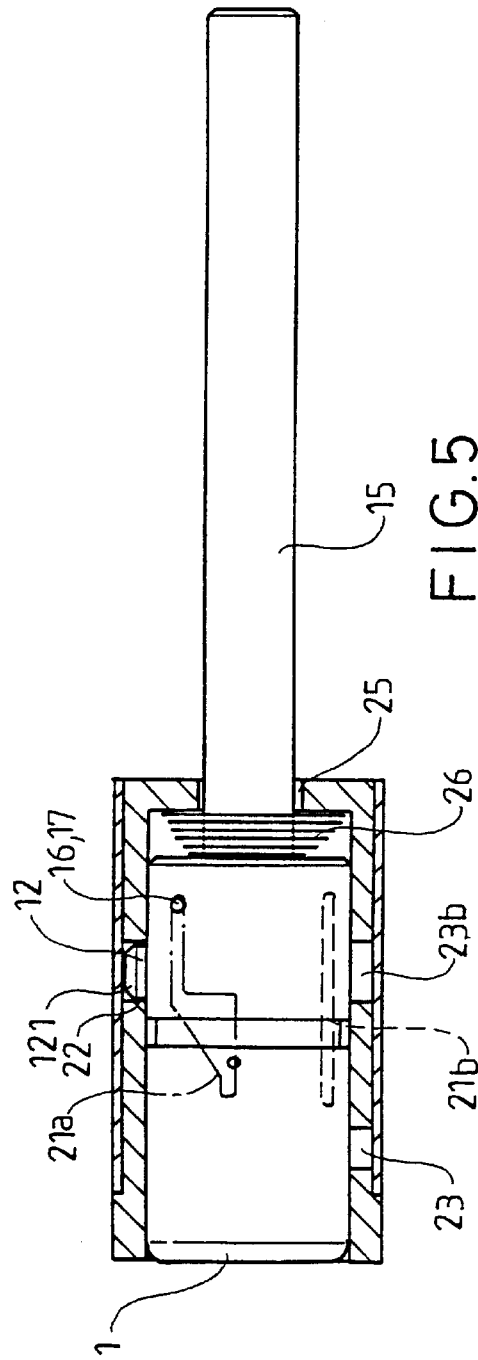

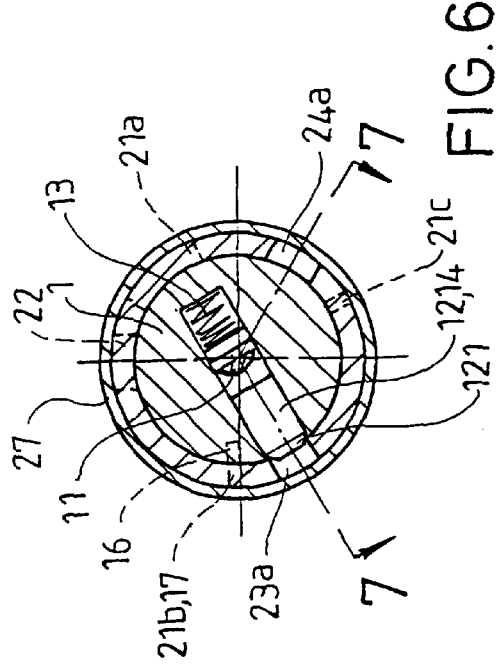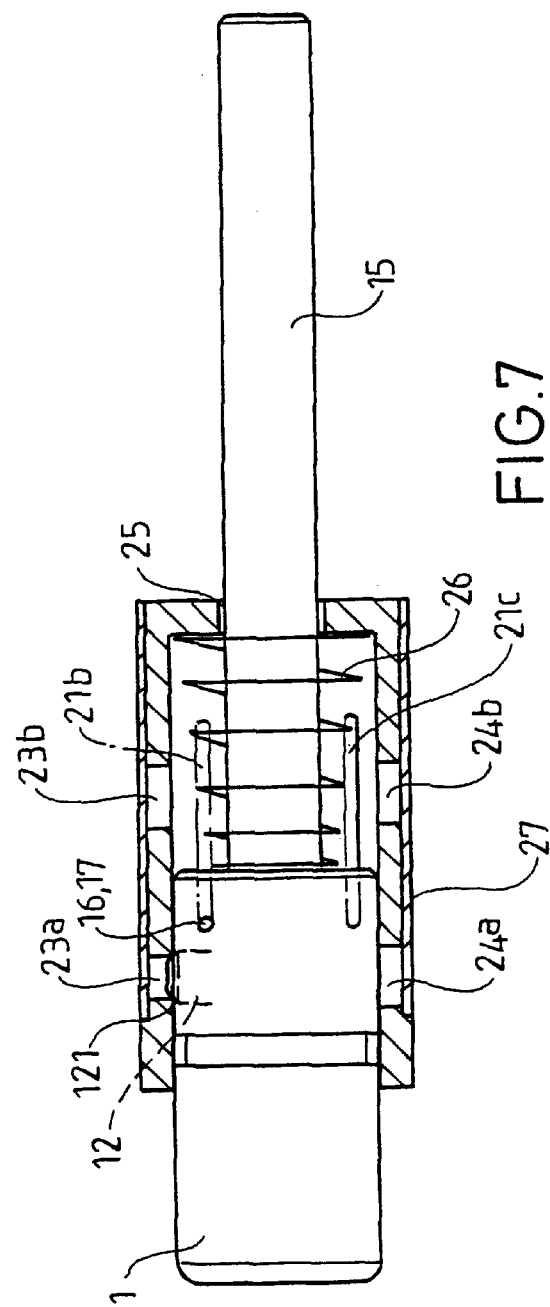

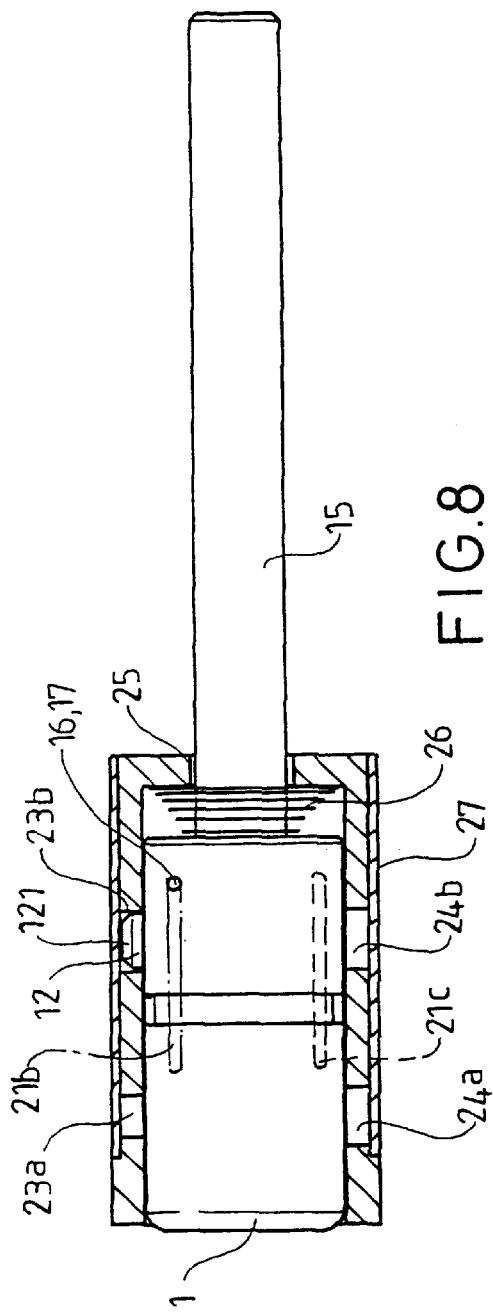
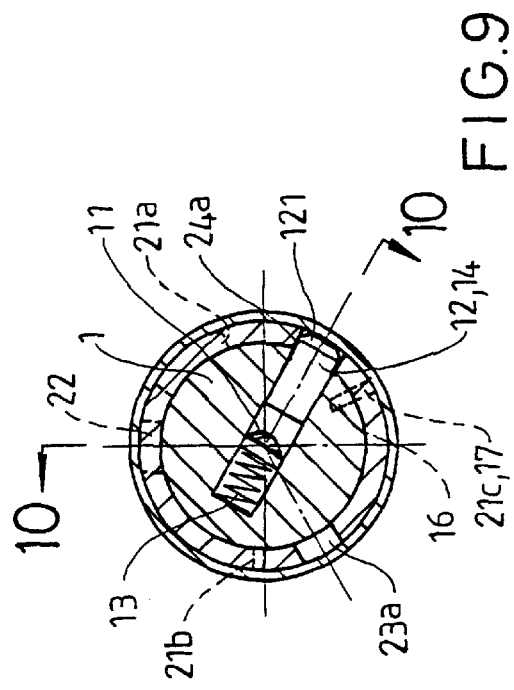

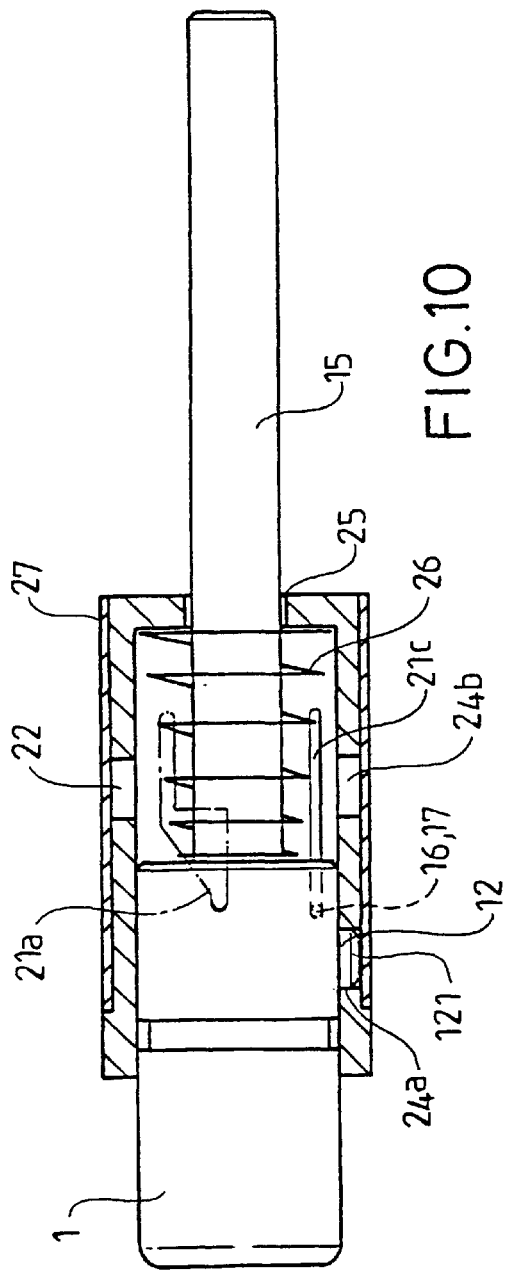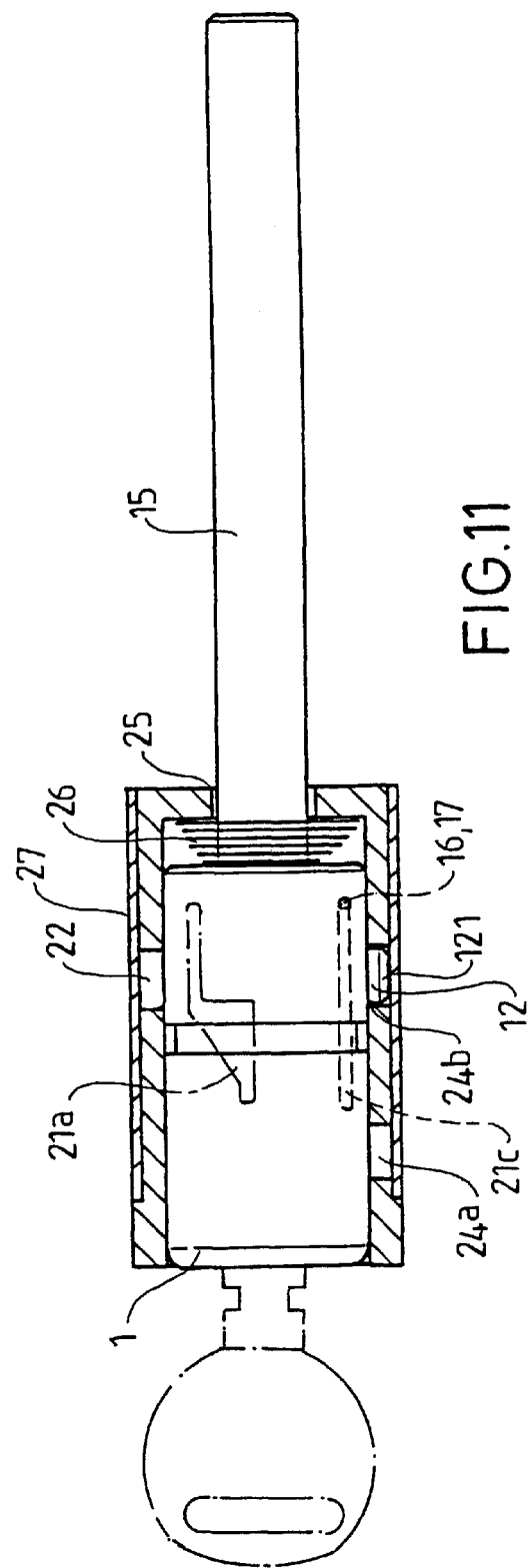

LOCK WITH CONVERTIBLE STRUCTURE

BACKGROUND OF THE INVENTION

The present invention relates to a lock which can be converted between a key-to-lock structure and a no-key-to-lock structure particularly for gear lever locks of automobiles or other locks.

Taiwan Laid-open Utility Patent No. 292627 discloses a hidden type gear lever lock comprising a lock with a lock core mounted therein. A control member is enclosed by a lid and actuatable by a key to make a latch rod to move longitudinally such that an end of the latch rod may prevent the gear lever from being moved to thereby lock the gear lever. The end of the latch rod may be moved away from the gear lever to a position not interfering with motion of the gear lever while the other end of the latch rod is extended beyond the gear lever box which allows the user to lock the gear lever again by means of pressing the other end of the latch rod. Nevertheless, after the gear lever lock has been manufactured, the user cannot optionally choose to operate the gear lever lock in a key-to-lock manner (i.e., the user has to use the key to lock the gear lever lock) or in a no-key-to-lock manner (i.e., the user may lock the gear lever lock without using the key). Accordingly, the manufacturers must produce either type of the gear lever locks according to the orders. More specifically, the manufacturers cannot mass-produce the locks before receiving orders.

The present invention is intended to provide an improved lock with a convertible structure which mitigates and/or obviates the above-mentioned problems.

SUMMARY OF THE INVENTION

It is a primary object of the present invention to provide a lock structure which is convertible between a key-to-lock structure and a no-key-to-lock structure particularly for gear lever locks of automobiles or other locks.

In accordance with one aspect of the invention, a convertible lock structure comprises:

a main body including a lock core received therein and operable by a proper key, the main body including a transverse hole defined therein, a spring-biased control latch having a first end received in the transverse hole and a second end, the main body further including a latch rod extending from an end thereof, a casing for receiving the main body and including an end wall with an opening through which the latch rod extends, the casing further including at least two positioning holes one of which is selected to receive the second end of the control latch, the second end of the control latch being operable by the proper key so as to move between a retracted position inside the main body which allows the main body to move in the casing and an extended position beyond the transverse hole to retain the main body in position, and means for returning the main body to its initial position.

The convertible lock structure further comprises a positioning element having a first end secured to the main body and a second end. The casing includes at least two guiding slots defined in a periphery thereof. The second end of the positioning element is received in one of the guiding slots to guide rectilinear movement of the main body in the casing.

The returning means may be a spring mounted around the latch rod and located between the end wall of the casing and the end of the main body.

In accordance with another aspect of the invention, a convertible lock structure comprises:

a main body including a lock core received therein and operable by a proper key, the main body including a transverse hole defined therein, a spring-biased control latch having a first end received in the transverse hole and a second end, the main body further including a latch rod extending from an end thereof, a casing for receiving the main body and including an end wall with an opening through which the latch rod extends, the casing further including a first set of positioning hole consisting of a first positioning hole and a second set of positioning holes consisting of two second positioning holes, the second end of the control latch being operable by the proper key so as to move between a retracted position inside the main body which allows the main body to move in the casing and an extended position beyond the transverse hole to retain the main body in position, and means for returning the main body to its initial position, wherein one of the first set of positioning hole and the second set of positioning holes is selected to receive the second end of the control latch, and wherein when the first set of positioning hole is selected, the lock structure is in a locked status when the second end of the control latch is received in the first positioning hole, and when the second set of positioning holes is selected, the lock structure is in a locked status when the second end of the control latch is received in one of the second positioning holes, and the lock structure is in an unlocked status when the second end of the control latch is received in the other of the second positioning holes.

The second end of the control latch includes a reduced, conic end section, and when the lock is in an unlocked status, the conic end section is received in said one of the second positioning holes of a diameter smaller that that of the second end of the control latch.

The convertible lock structure further comprises a positioning element having a first end secured to the main body and a second end. The casing includes a first guiding slot and a second guiding slot defined in a periphery thereof. The second end of the positioning element is received in one of the first guiding slot and the second guiding slot to guide rectilinear movement of the main body in the casing.

In accordance with a further aspect of the invention, a convertible lock structure comprises:

a main body including a lock core received therein and operable by a proper key, the main body including a transverse hole defined therein, a spring-biased control latch having a first end received in the transverse hole and a second end, the main body further including a latch rod extending from an end thereof, a casing for receiving the main body and including an end wall with an opening through which the latch rod extends, the casing further including a first set of positioning hole consisting of a first positioning hole, a second set of positioning holes consisting of two second positioning holes, and a third set of positioning holes consisting of two third positioning holes, the second end of the control latch being operable by the proper key so as to move between a retracted position inside the main body which allows the main body to move in the casing and an extended position beyond the transverse hole to retain the main body in position, a positioning element having a first end secured to the main body and a second end, and the casing including a first guiding slot, a second guiding slot, and a third guiding slot defined in a periphery thereof, the second end of the positioning element being received in one of the first guiding slot, the second guiding slot, and the third guiding slot corresponding to the selection of the first set of positioning hole, the second set of positioning holes, and the third set of positioning holes to guide rectilinear movement of the main body in the casing, and means for returning the main body to its initial position, wherein one of the first set of positioning hole, and the second set of positioning holes, and the third set of positioning holes is selected to receive the second end of the control latch, and wherein when the first set of positioning hole is selected, the lock structure is in a locked status when the second end of the control latch is received in the first positioning hole, when the second set of positioning holes is selected, the lock structure is in a locked status when the second end of the control latch is received in one of the second positioning holes, and the lock structure is in an unlocked status when the second end of the control latch is received in the other of the second positioning holes, and when the third set of positioning holes is selected, the lock structure is in a locked status when the second end of the control latch is received in one of the third positioning holes, and the lock structure is in an unlocked status when the second end of the control latch is received in the other of the third positioning holes.

The second end of the control latch includes a reduced, conic end section. When the second end of the positioning element is received in the second guiding slot and when the lock structure is in an unlocked status, the conic end section is received in said one of the second positioning holes of a diameter smaller than that of the second end of the control latch. When the lock structure is in a locked status, the second end of the control latch of a diameter larger than that of the conic end section is received in the other second positioning hole. The proper key is not required when changing the lock structure from the unlocked status to the locked status in this lock structure.

When the second end of the positioning element is received in the third guiding slot, the proper key is required to change the lock structure from the unlocked status to the locked status.

In a preferred embodiment of the invention, the first guiding slot is substantially S-shaped. When the second end of the positioning element is received in the first guiding slot, and when the second end of the control latch is in an unlocked status not received in the first positioning hole, the proper key is required to change the lock structure from the unlocked status to the locked status.

Other objects, advantages, and novel features of the invention will become more apparent from the following detailed description when taken in conjunction with the accompanying drawings.

BRIEF DESCRIPTION OF THE DRAWINGS

FIGS. 4 and 5 are views similar to FIG. 2, illustrating operation of the lock;

FIG. 6 is a sectional view of the convertible lock structure in a second type of structure;

FIG. 7 is a sectional view taken along line 7—7 in FIG. 6;

FIG. 8 is a view similar to FIG. 7, illustrating operation of the lock;

FIG. 9 is a sectional view of the convertible lock structure in a third type of structure;

FIG. 10 is a sectional view taken along line 10—10 in FIG. 9; and

FIG. 11 is a view similar to FIG. 10, illustrating operation of the lock.

DESCRIPTION OF THE PREFERRED EMBODIMENTS

Figure 1:
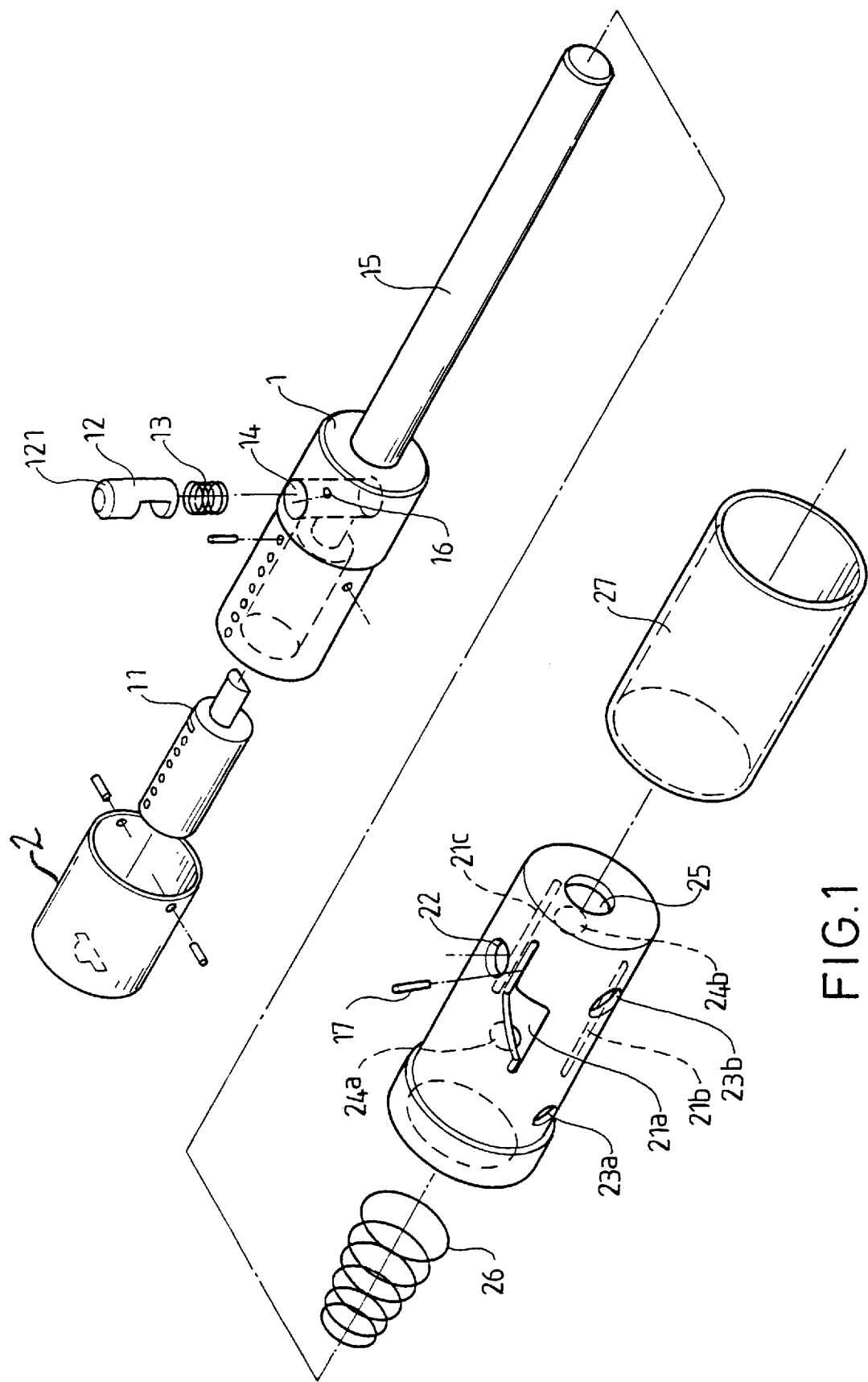
FIG. 1 is an exploded perspective view of a convertible lock structure in accordance with the present invention.

Referring to the drawings and initially to FIG. 1, a convertible lock structure in accordance with the present invention generally includes a main body 1 and a casing 2 for housing the main body 1. The main body 1 includes a compartment (not labeled) for receiving a lock core 11 therein. The main body 1 further includes a transverse hole 14 defined therein for receiving a first end of a control latch 12 and a spring 13 which biases the control latch 12 outwardly. The control latch 12 includes a reduced, conic end section 121 which will be described later. The control latch 12 is operable by a proper key to move between a retracted position and an extended position. A latch rod 15 extends outwardly from an end of the main body 1 so as to be received in a hole of an object or to act as a stop, thereby providing a locking function. The main body 1 further includes a positioning hole 16 defined therein for partially receiving a positioning element, e.g., a pin 17.

The casing 2 is a hollow cylindrical member for receiving the main body 1 therein. The casing 2 includes a substantially S-shaped first guiding slot 21a, a rectilinear second guiding slot 21b, and a rectilinear third guiding slot 21c defined in an outer periphery thereof. One of the three guiding slots 21a–21c is selected to engage with the pin 17. A positioning hole 22 is defined beside the guiding slot 21a, two positioning holes 23a and 23b are defined beside the guiding slot 21b, and two positioning holes 24a and 24b are defined beside the guiding slot 21c, wherein each of the positioning holes 22, 23b, 24a, and 24b are of a larger diameter through which the larger diameter portion of a second end of the control latch 12 is extendible, while the positioning hole 23a is of a smaller diameter through which the control latch 12 is not extendible yet the reduced conic section 121 of the second end of the control latch 12 is extendible. The casing 2 further includes an opening 25 defined in an end wall thereof through which the latch rod 15 extends, and a spring 26 is mounted around the latch rod 15 and located between the main body 1 and the end wall of the casing 2 for returning the main body 1 to its initial position. An outer sleeve 27 may be provided around the casing 2 to prevent from disengagement of the control latch 12.

Figure 2:
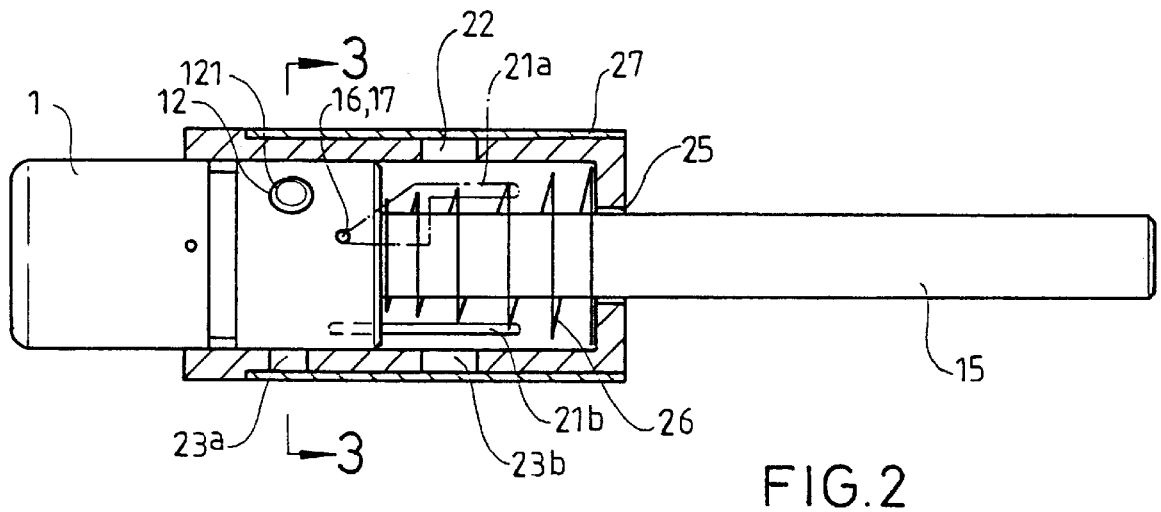
FIG. 2 is a sectional view, taken along line 2—2 in FIG. 3, of the convertible lock structure in a first type of structure.
Figure 3:
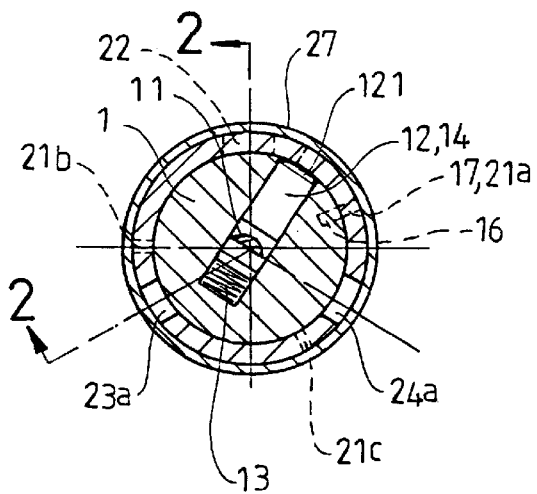
FIG. 3 is a sectional view taken along line 3—3 in FIG. 2.

FIGS. 2 and 3 show a first structure type constructed by the convertible lock structure in accordance with the present invention, in which the other end of the pin 17 is received in the first guiding slot 21a. The main body 1 is biased by the spring 26 and extends beyond the casing 2, and the latch rod 15 extends beyond the casing 2 at a small extent and thus does not provide the locking function. If locking is required, the user may press the main body 1 such that the spring 26 is partially compressed (see FIG. 4). Due to the S-shaped construction of the first guiding slot 21a, the user must rotate the main body 1 (by using the proper key) to a status shown in FIG. 4 such that the user may further press the main body 1 to further compress the spring 26. The latch rod 15 in FIG. 5 is in a position for locking, while the larger diameter portion of the second end of the control latch 12 is partially received in the positioning hole 22 for positioning.

FIGS. 6 and 7 show a second structure type constructed by the convertible lock structure in accordance with the present invention, in which the other end of the pin 17 is received in the second guiding slot 21b, while the second end of the control latch 12 is partially received one of the positioning hole 23a (when in an unlocked position, FIG. 7) and the positioning hole 23b (when in a locked position, FIG. 8). As shown in FIG. 7, the reduced conic end section 121 of the second end of the control latch 12 is received in the positioning hole 23a such that the user may directly press the main body 1 to a locked status shown in FIG. 8 without using the proper key as the reduced, conic end section 121 may be disengaged from the positioning hole 23a under pressing of the main body 1. It is appreciated that the larger diameter portion of the second end of the control latch 12 is partially received in the positioning hole 24b, as shown in FIG. 8.

FIGS. 9 and 10 show a third structure type constructed by the convertible lock structure in accordance with the present invention, in which the other end of the pin 17 is received in the third guiding slot 21c, while the second end of the control latch 12 is partially received one of the positioning hole 24a (when in an unlocked position, FIG. 10) and the positioning hole 24b (when in a locked position, FIG. 11). As shown in FIG. 10, the second end of the control latch 12 is received in the positioning hole 23a at the larger diameter portion such that the user cannot directly press the main body 1 to a locked status. Namely, the user has to use the proper key to retract the control latch 12 into the main body 1 to allow sliding movement of the main body 1 in the casing 2. When the main body 1 reaches a position shown in FIG. 11, where the larger diameter portion of the second end of the control latch 12 is extended into the positioning hole 24b to thereby provide the required locking function as the latch rod 15 is further extended.

According to the above description, it is appreciated that the lock structure in accordance with the present invention is convertible among three different types of structures such that the manufacturers may mass-produce the locks before receiving orders, and the user may convert the lock structure into the required structure type for ease of operation.

Although the invention has been explained in relation to its preferred embodiment, it is to be understood that many other possible modifications and variations can be made without departing from the spirit and scope of the invention as hereinafter claimed.

What is claimed is:

1. A convertible lock structure, comprising:
   a main body (1) including a lock core (11) received therein and operable by a proper key, the main body including a transverse hole (14) defined therein, a spring-biased control latch (12) having a first end received in the transverse hole (14) and a second end, the main body further including a latch rod (15) extending from an end thereof,
   a casing (2) for receiving the main body and including an end wall with an opening (25) through which the latch rod (15) extends, the casing further including a first positioning hole (22) and a set of positioning holes comprising two second positioning holes (23a and 23b; 24a and 24b), the second end of the control latch (12) being operable by the proper key so as to move between a retracted position inside the main body (1) which allows the main body to move in the casing and an extended position beyond the transverse hole (14) to retain the main body in position, and
   means (26) for returning the main body to initial position thereof,
   wherein one of the first positioning hole (22) and the second positioning holes is selected to receive the second end of the control latch (12), and wherein
   when the first positioning hole (22) is selected, the lock structure is in a locked status when the second end of the control latch (12) is received in the first positioning hole (22), and
   when the second positioning holes is selected, the lock structure is in a locked status when the second end of the control latch (12) is received in one of the second positioning holes (23b; 24b), and the lock structure is in an unlocked status when the second end of the control latch (12) is received in the other of the second positioning holes (23a; 24a).

2. The convertible lock structure according to claim 1, wherein the second end of the control latch (12) includes a reduced, conic end section (121), and when the lock is in an unlocked status, the conic end section (121) is received in said one of the second positioning holes (23a) of a diameter smaller that that of the second end of the control latch (12).

3. The convertible lock structure according to claim 1, further comprising a positioning element (17) having a first end secured to the main body (1) and a second end, and the casing (2) including a first guiding slot (21a) and a second guiding slot (21b; 21c) defined in a periphery thereof, the second end of the positioning element (17) being received in one of the first guiding slot (21a) and the second guiding slot (21b; 21c) to guide rectilinear movement of the main body (1) in the casing (2).

4. The convertible lock structure according to claim 3, wherein the first guiding slot (21a) is substantially S-shaped.

5. A convertible lock structure, comprising:
   a main body (1) including a lock core (11) received therein and operable by a proper key, the main body including a transverse hole (14) defined therein, a spring-biased control latch (12) having a first end received in the transverse hole (14) and a second end, the main body further including a latch rod (15) extending from an end thereof,
   a casing (2) for receiving the main body and including an end wall with an opening (25) through which the latch rod (15) extends, the casing further including a first positioning hole (22), a set of positioning holes comprising two second positioning holes (23a and 23b), and a set of positioning holes comprising two third positioning holes (24a and 24b), the second end of the control latch (12) being operable by the proper key so as to move between a retracted position inside the main body (1) which allows the main body to move in the casing and an extended position beyond the transverse hole (14) to retain the main body in position,
   a positioning element (17) having a first end secured to the main body (1) and a second end, and the casing (2) including a first guiding slot (21a), a second guiding slot (21b), and a third guiding slot (21c) defined in a periphery thereof, the second end of the positioning element (17) being received in one of the first guiding slot (21*a*), the second guiding slot (21*b*), and the third guiding slot (21*c*) corresponding to the selection of the first positioning hole (22), the second positioning holes (23*a* and 23*b*), and the third positioning holes (24*a* and 24*b*) to guide rectilinear movement of the main body (1) in the casing (2), and means (26) for returning the main body to initial position thereof, wherein one of the first positioning hole, and the second positioning holes, and the third positioning holes is selected to receive the second end of the control latch, and wherein when the first positioning hole (22) is selected, the lock structure is in a locked status when the second end of the control latch (12) is received in the first positioning hole (22), when the second positioning holes (23*a* and 23*b*) is selected, the lock structure is in a locked status when the second end of the control latch (12) is received in one of the second positioning holes (23*b*), and the lock structure is in an unlocked status when the second end of the control latch (12) is received in the other of the second positioning holes (23*a*), and when the third positioning holes (24*a* and 24*b*) is selected, the lock structure is in a locked status when the second end of the control latch (12) is received in one of the third positioning holes (24*b*), and the lock structure is in an unlocked status when the second end of the control latch (12) is received in the other of the third positioning holes (24*a*).

6. The convertible lock structure according to claim 5, wherein the second end of the control latch (12) includes a reduced, conic end section (121), when the second end of the positioning element (17) is received in the second guiding slot (21*b*) and when the lock structure is in an unlocked status, the conic end section (121) is received in said one of the second positioning holes (23*a*) of a diameter smaller than that of the second end of the control latch (12), and when the lock structure is in a locked status, the second end of the control latch (12) of a diameter larger than that of the conic end section (121) is received in the other second positioning hole (23*b*), and the proper key is not required when changing the lock structure from the unlocked status to the locked status.

7. The convertible lock structure according to claim 5, wherein when the second end of the positioning element (17) is received in the third guiding slot (21*c*), and the proper key is required to change the lock structure from the unlocked status to the locked status.

8. The convertible lock structure according to claim 5, wherein the first guiding slot (21*a*) is substantially S-shaped.

9. The convertible lock structure according to claim 8, wherein when the second end of the positioning element (17) is received in the first guiding slot (21*a*), and the second end of the control latch (12) is in an unlocked status not received in the first positioning hole (22), the proper key is required to change the lock structure from the unlocked status to the locked status.

* * * * *